United States Patent

De Krom

[11] Patent Number: 5,264,153
[45] Date of Patent: Nov. 23, 1993

[54] CRYSTALLINE POLYESTER RESINS SUITABLE FOR PRODUCING FLUORESCENT PIGMENTS

[75] Inventor: Adrian De Krom, Newbury, Ohio

[73] Assignee: Day-Glo Color Corp.

[21] Appl. No.: 911,999

[22] Filed: Jul. 10, 1992

Related U.S. Application Data

[63] Continuation of Ser. No. 620,953, Dec. 3, 1990, abandoned.

[51] Int. Cl.5 ............................................. C09K 11/06
[52] U.S. Cl. ........................... 252/301.35; 252/301.21; 528/307; 528/308
[58] Field of Search ................... 252/301.35; 528/307, 528/308

[56] References Cited

U.S. PATENT DOCUMENTS

| | | | |
|---|---|---|---|
| 2,809,954 | 10/1957 | Kazenas | 252/301.35 |
| 2,938,873 | 5/1960 | Kazenas | 252/301.35 |
| 3,198,741 | 8/1965 | Kazenas | 252/301.35 |
| 3,412,036 | 11/1968 | McIntosh | 252/301.35 |
| 3,769,229 | 10/1973 | Noetzel | 252/301.35 |
| 3,812,054 | 5/1974 | Noetzel | 252/301.35 |
| 3,922,232 | 11/1975 | Schein | 252/301.35 |
| 4,350,808 | 9/1982 | McConnell | 528/302 |
| 4,387,214 | 6/1983 | Passmore | 528/307 |

FOREIGN PATENT DOCUMENTS 2507776 2/1975 Fed. Rep. of Germany .

Primary Examiner—Ellen McAvoy
Attorney, Agent, or Firm—Calfee, Halter & Griswold

[57] ABSTRACT

Crystalline thermoplastic opaque polyester resins having substantial amounts of amorphous regions are disclosed. When fluorescent dyes are dispersed into these resins superior fluorescent pigments result.

8 Claims, 1 Drawing Sheet

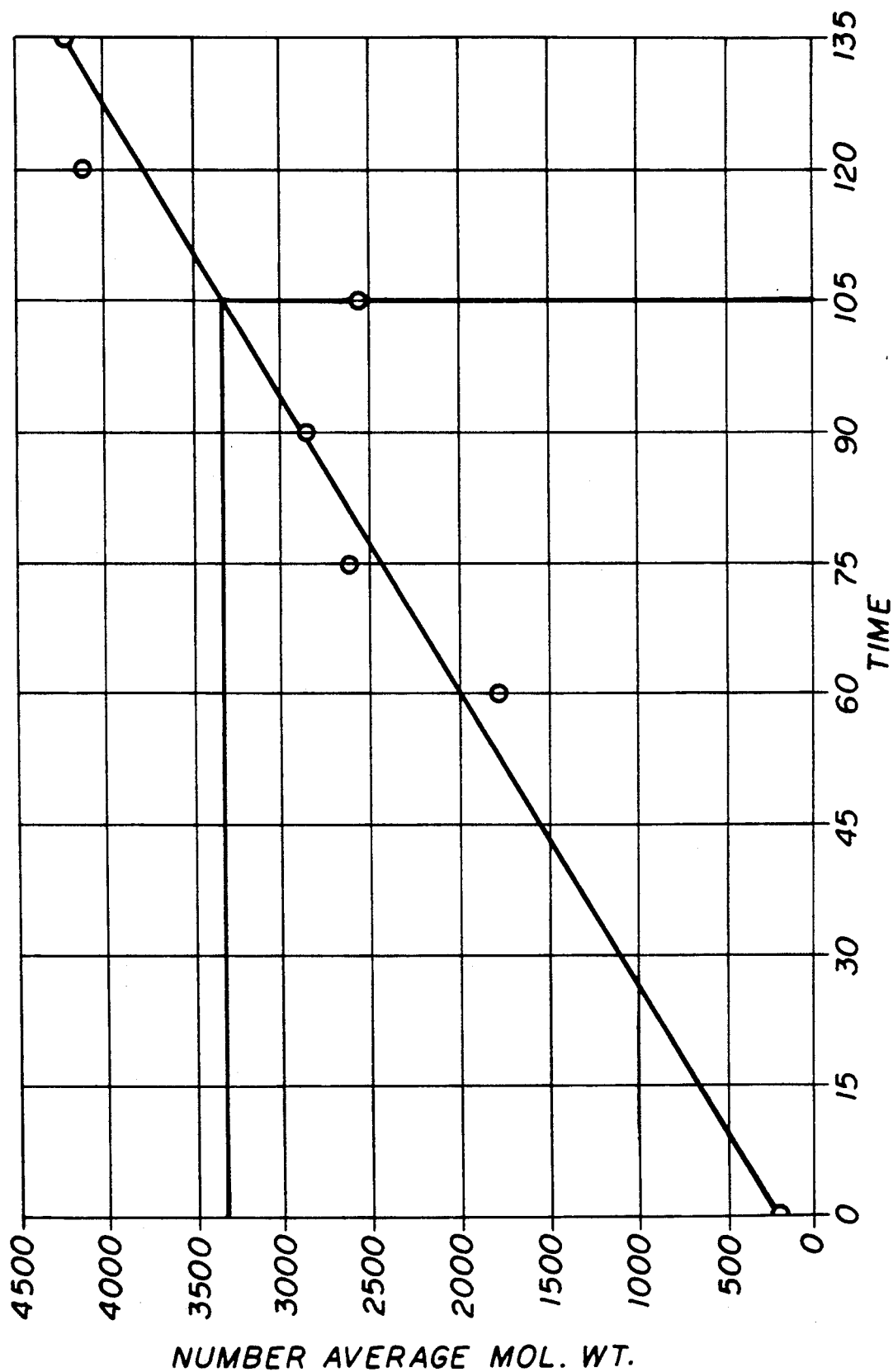

CRYSTALLINE POLYESTER RESINS SUITABLE FOR PRODUCING FLUORESCENT PIGMENTS

This is a continuation of copending application Ser. No. 07/620,953 filed on Dec. 3, 1990, now abandoned.

INTRODUCTION

This invention relates to new fluorescent pigments, more particularly to modified thermoplastic polyester fluorescent pigments, which are crystalline in nature, containing one or more coloring materials dispersed, dissolved or reacted in the thermoplastic polymer in a finely-divided condition. This pigment can then be reduced to a finely divided solid using grinding or milling equipment. The application of this colored pigment is primarily for coloring waterbased paints, waterbased inks, and plastics.

The polymer systems of the invention are capable of solubilizing, dispersing or reacting with a wide variety of fluorescent dyestuffs adequately enough to yield brilliant colors, while simultaneously providing sufficient chemical resistance to protect those dyes from attack by certain solvents, particularly chemicals capable of hydrogen bonding such as water, alcohol, glycols, glycol ethers, ammonia, amines, amides and even low molecular weight ethers and ketones capable of forming hydrogen bridge structures. The polymers also are capable of shielding the dyes from thermal decomposition to aid its usefulness in plastic products. They provide sufficient protection against UV radiation to grant adequate fade resistant characteristics to the colored pigment.

Traditionally, chemical resistance is obtained by curing a crosslinkable polymer which forms a thermoset material. This is usually a two-step process. Fluorescent thermoset polymers are generally higher molecular weight than their thermoplastic counterparts. To maintain grindability, the molecular weight must be kept relatively low. Crystalline polymers can be designed to maintain relatively low molecular weights while providing chemical resistance by the efficient packing of the polymer chains, so that resistance is attained in a one-step process; crystallization occurs upon cooling.

Various polymers have the capability of being used as a carrier for dyes and other coloring materials. Many products used in the textile industry are solution dyed; a practice where the dyes are adsorbed or reacted onto the surface of the polymer. Many colored pigments currently used in the fluorescent colorant industry contain dyes incorporated into the polymer. Many have been reported in literature. These include melamine-toluene sulfonamide-formaldehyde polymers, polyamide polymers, and polyester polymers. These polymers are either thermoplastic or thermoset depending on the desired properties required of the pigment. All of these polymers are amorphous in character.

In accordance with the current invention, pigments are produced from crystalline polymers by incorporating a coloring material, such as a dye, into the polymer. Thermoplastic polymers, typically used as dye carriers, are amorphous and therefore transparent in nature, the crystalline polymers of this invention are naturally opaque. This characteristic is indicative of its crystallinity. The consequences of this crystallinity reach far beyond its appearance. Crystallinity in polymeric materials is caused by tight packing of the polymer chains. One consequence of this packing is dramatically improved physical properties over a similar structure in its amorphous state. This is evident from the melt point of this polymer. In amorphous form, the softening point of a polymer is significantly below the melt point of a similar polymer in its crystalline state. In fact, amorphous polymers are solid state liquids. They have no melt point. Instead they have a glass transition temperature where they appear to melt.

A crystalline polymer, however, is a true solid with an actual melt point. This phenomena imparts many desirable properties to the polymer. For example, these polymers possess superior solvent resistant properties. The polymers of this invention are not soluble in hydrogen bonding solvents such as water, alcohols, glycols, ammonia, amines, and amides such as DMF. It is also insoluble in oxygenated solvents such as ketones (acetone, MEK) and low molecular weight ethers such as DME. In addition to this, it has resistance to aliphatic and aromatic solvents such as hexane and toluene. The polymer's low polarity, inability to hydrogen bond, and excellent heat stability, also make them suitable for use in certain plastic applications such as calendered vinyl.

The ability for a thermoplastic polymer to crystallize depends on the structure of the monomers making up the polymer, the ability of the chains to pack tightly in an ordered manner, the molecular weight of the polymer, and the rate of cooling. In order to make such a polymer applicable for use as a fluorescent pigment, it must be capable of solubilizing, dispersing or reacting with a variety of dyestuffs in the same region of the polymer so that dyes of different compositions are intimately mixed at the molecular level in order to provide brilliant, clean colors in a variety of shades. It is believed that this effect best occurs in the amorphous regions of a polymer when it is dyed in the molten form. All crystalline polymers contain some amorphous regions. A novel feature of this invention, is to elucidate compositions that optimize the amorphous content of the polymer, in order to enhance its ability for dye acceptance, without sacrificing its crystalline nature.

THE DRAWING

The drawing is a graph illustrating the relationship between time of polymerization and number average molecular weight.

THE INVENTION

In accordance with this invention, it has been found that crystalline, thermoplastic polyester polymers useful in producing pigments can be formed by reacting linear aliphatic, para aromatic, or trans-1,4 cyclohexyl difunctional carboxylic acids and their corresponding esters or anhydrides; with linear aliphatic, para aromatic, or trans-1,4 cylclohexyl difunctional hydroxy compounds. Similar structures containing both a carboxylic acid and hydroxy compound on the same molecule can be used.

In order to increase the amorphous content of the polymer, it can be modified with up to 60 equivalent % branched or substituted aliphatic difunctional carboxylic acids and their corresponding esters and anhydrides, branched or substituted difunctional aliphatic hydroxy compounds; ortho or meta substituted difunctional aromatic carboxylic acids, their corresponding esters and anhydrides, ortho or meta substituted difunctional aromatic hydroxy compounds; cis or trans 1,2 and 1,3 difunctional cyclohexyl carboxylic acids, their corresponding esters and anhydrides, and hydroxy compounds and cis 1,4 cyclohexyl difunctional carboxylic acids, their corresponding esters, and hydroxy compounds; trifunctional aliphatic, aromatic, or cyclical carboxylic acids and their corresponding esters and anhydrides, and trifunctional aliphatic, aromatic, and cyclical hydroxy compounds.

The amount of crystallinity producing monomers present in the resin ranges from 35 to 95 equivalent % preferably the amount is between 55 to 80 equivalent %. The monomers used to produce the amorphous regions in the crystalline resins may vary between 5 to 65 equivalent % and preferably between 20-45 equivalent percent.

The crystallinity producing monomers e.g. the dicarboxylic acids and the dihydroxy compounds are combined in an equivalent % ratio of from 1:2.5 to 2.5:1.

The molecular weight of the resins is relatively low e.g. between 500-50,000. In a preferred embodiment the molecular weight ranges between 500-5,000. A typical molecular weight is about 3,000. These molecular weights are number average molecular weights. The relationship between time of polymerization in relation to molecular weight is shown in the drawing.

The Crystallinity Producing Dicarboxylic Acids

The difunctional carboxylic acid component needed to impart crystallinity, as stated, comprises of at least one linear aliphatic, para aromatic, or trans-1,4 cyclohexyl difunctional carboxylic acid, its corresponding ester, or anhydride derivatives. Typical carboxylic acid components include oxalic, malonic, succinic, glutaric, adipic, pimelic, suberic, azelaic, sebacic, undecanedioic, 1,10 decane-dicarbhoxylic acid, trans-1,4 cyclohexanedicarboxylic acid, terephthalic acid, dimethylterephthalate, and 2,6 naphthalene dicarboxylic acid. The preferred acids are terphthalic acid, dimethylterephthalate and trans-1,4 cyclohexane dicarboxylic acid.

The Crystallinity Producing Diols

The difunctional hydroxy compound which is reacted with the difunctional acid component required to form a crystalline polymer, as stated, comprises of at least one linear aliphatic, para aromatic, or trans-1,4 cyclohexyl difunctional hydroxy compound. Typical hydroxy compounds include ethylene glycol, propylene glycol, 1,4 butanediol, 1,5 pentanediol, 1,6 hexanediol, 1,7 heptanediol, 1,8 octanediol, 1,9 nonanediol, 1,10 decanediol, 1,12 dodecanediol, trans-1,4 cyclohexanediol, trans-1,4 cyclohexanedimethanol, and 1,4 benzenedimethanol. A preferred diol is trans-1,4 cyclohexanedimethanol.

In addition to the above, compounds containing both a carboxylic acid component and a hydroxy component on the same molecule can also build crystallinity into the structure of a polymer. They may be linear hydroxy aliphatic monocarboxylic acids, para-hydroxy aromatic carboxylic acids and trans 1-hydroxy, 4-cyclohexylcarboxylic acids and their corresponding ester derivatives. Hydroxyacetic acid and para-hydroxy benzoic acid are examples of these compounds. These monomers may be incorporated into the polymers in amounts ranging between 0-100% by weight.

The Amorphous Resin Producing Monomers

The monomers necessary to increase the amorphous content of the polymer encompass a broad range of compounds. As stated they include branched aliphatic; 1,2 and 1,3 difunctional substituted and non-substituted aromatic; cis or trans 1,2 or 1,3 cyclohexyl, and cis 1,4 cyclohexyl carboxylic acids, their corresponding esters and anhydrides, and hydroxy compounds; polyfunctional carboxylic acids and their corresponding esters and anhydrides, and hydroxy compounds. Some typical compounds representative of the groups mentioned above include neopentyl glycol, isophthalic acid, tertiary butyl isophthalic acid, trimellitic anhydride, trimethylolpropane, trimethylolethane, glycerol, cis 1,4 cyclohexanedimethanol, and tris (2-hydroxyethyl)isocyanurate.

Optional Ingredients

The resins can be modified by terminating with up to 30 equivalent percent monofunctional aliphatic, aromatic, or cyclical carboxylic acids, their corresponding esters or anhydrides, and hydroxy compounds.

The monofunctional components which can be used to impart a variety of characteristics to the polymer, as stated, are comprised of monofunctional aliphatic, aromatic, or cyclical carboxylic acids, their corresponding esters and anhydrides, and hydroxy compounds. Typical monofunctional terminators include acetic acid, isononanoic acid, benzoic acid, methyl benzoate, para-toluic acid, para-chlorobenzoic acid, para-tertiary butyl benzoic acid, para-amino benzoic acid, picolinic acid, nicotinic acid, isonicotinic acid, napthoic acid, their corresponding esters and anhydrides; and butanol, benzyl alcohol, cyclohexanol, and cyclododecanol.

Polymerization Catalysts and Processing Aids

The catalysts are added at a level between 0.01 and 5.0 percent based on the weight of the polymer. The additives and processing aids are added at level between 0.1 to 15.0 weight percent. The amount of material should not adversely affect the basic properties of the fluorescent polymer composition. Some typical catalysts are as follows, para-toluene sulfonic acid, dibutyltin oxide, butyltin-tris-2-ethylhexoate, lithium ricinoleate, and organo titanates. The additives include UV absorbers and anti-oxidants such as hindered amines and triphenylphosphates. Typical processing aid include heat stabilizers for dyes such as metal carboxylates, metal carbonates, and metal oxides. A few examples from this group include zinc acetate, zinc stearate, zinc oxide, zinc carbonate, antimony triacetate, calcium carbonate, calcium hydroxide, and magnesium oxide.

The Fluorescent Dyes

Finally, the fluorescent dyes employed in the composition include fluorescent organics which are brilliantly fluorescent when in solution. These daylight fluorescent-type dyes are commonly used and belong to the dye families known as rhodamines, perylenes, fluoresceins, coumarins, naphthalimides, benzoxanthenes, and acridines. The dyes make-up between 0.1 to 15.0% based on the weight of the polymer. Typical dyes include Basic Red 1, Basic Violet 10, Basic Violet 11, Basic Violet 16, Basic Yellow 40, Solvent Yellow 44, Solvent Yellow 126, Solvent Yellow 131, Solvent Yellow 135, Solvent Yellow 43, and Solvent Yellow 160.

Preparation of the Resins

The compositions of the present invention are prepared by condensation polymerization reactions illustrated by the following examples. The compositions are prepared by heating a mixture of the reactants to effect the polymerization thereof. Polymerization is typically completed with heating to a maximum temperature of between 160° to 280° C. and providing an adequate dwell time.

EXAMPLES

The following examples were prepared using a reaction vessel equipped with an agitator, heating means, a nitrogen blanket, and a condenser designed to remove the water of reaction.

EXAMPLE 1

The following material was cold charged into a reaction flask, heated to 270° C. and reacted for 3 hours, the material was then cooled to 230° C., dyed and dumped. After cooling to room temperature, the pigment was ground.

| MATERIAL | EQUIVALENT RATIO | WEIGHT 100 GRAM YIELD |
|---|---|---|
| Ethylene Glycol | .27 | 14.06 |
| Cyclohexanedimethanol (90%) | .27 | 36.35 |
| Terephthalic Acid | .45 | 62.82 |
| Solvent Yellow 135 | — | 0.70 |

EXAMPLE 2

The following material was cold charged into the reaction flask, heated to 270° C., held for 2 hours, cooled to 220° c., dyed and dumped. The pigment was allowed to cool to room temperature and ground.

| MATERIAL | EQUIVALENT RATIO | WEIGHT 100 GRAM YIELD |
|---|---|---|
| Cyclohexanedimethanol (90%) | .52 | 59.85 |
| Trimethylolpropane | .03 | 1.92 |
| Terephthalic Acid | .45 | 53.68 |
| Solvent Yellow 160 | — | 1.00 |

EXAMPLE 3

Same procedure as example 2.

| MATERIAL | EQUIVALENT RATIO | WEIGHT 100 GRAM YIELD |
|---|---|---|
| Cyclohexanedimethanol (90%) | .50 | 55.60 |
| Trimethylolpropane | .03 | 1.86 |
| Cyclododecanol (86%) | .02 | 5.94 |
| Isophthalic Acid | .1125 | 12.96 |
| Terephthalic Acid | .3375 | 38.92 |
| Solvent Yellow 131 | — | 2.00 |

EXAMPLE 4

Same procedure as example 2.

| MATERIAL | EQUIVALENT RATIO | WEIGHT 100 GRAM YIELD |
|---|---|---|
| Cyclohexanedimethanol (90%) | .50 | 58.75 |
| Glycerol (99%) | .03 | 1.36 |
| Isophthalic Acid | .1645 | 20.03 |
| Terephthalic Acid | .3055 | 37.22 |
| Solvent Yellow 136 | — | 0.70 |

EXAMPLE 5

The procedure is the same as example 2.

| MATERIAL | EQUIVALENT RATIO | WEIGHT 100 GRAM YIELD |
|---|---|---|
| Cyclohexanedimethanol (90%) | .4688 | 60.87 |
| Trimethylolpropane | .02 | 1.44 |
| tris(2-hydroxyethyl)-Isocyanurate | .03 | 4.23 |
| Isophthalic Acid | .14 | 18.85 |
| Terephthalic Acid | .3266 | 43.98 |
| Benzoic Acid | .015 | 2.96 |
| Solvent Yellow 135 | — | 0.50 |
| Basic Red 1 | — | 0.15 |
| Basic Violet 11 | — | 0.30 |

EXAMPLE 4

The following material was cold charged into the reaction vessel, equipped with a precondensor to reflux the DMT, and a total condensor to condense the methanol in order to remove it from the reaction. The material was heated to 230° C., dyed, held an additional 15 minutes and dumped.

| MATERIAL | EQUIVALENT RATIO | WEIGHT 100 GRAM YIELD |
|---|---|---|
| Cyclohexanedimethanol (90%) | .365 | 40.53 |
| tris(2-hydroxyethyl)-Isocyanurate | .135 | 16.28 |
| Dimethylterephthalate | .48 | 64.59 |
| Benzoic Acid | .02 | 3.38 |
| Basic Red 1 | — | 0.56 |
| Basic Violet 11 | — | 1.83 |

EXAMPLE 7

Procedure the same as example 6.

| MATERIAL | EQUIVALENT RATIO | WEIGHT 100 GRAM YIELD |
|---|---|---|
| Cyclohexanedimethanol (90%) | .49 | 56.14 |
| tris(2-hydroxyethyl)-Isocyanurate | .03 | 3.73 |
| Dimethylterephthalate | .48 | 66.65 |
| Solvent Yellow 160 | — | 2.00 |

EXAMPLE 8

Procedure the same as example 6.

| MATERIAL | EQUIVALENT RATIO | WEIGHT 100 GRAM YIELD |
|---|---|---|
| Cyclohexanedimethanol (90%) | .36 | 40.08 |
| tris(2-hydroxyethyl)-Isocyanurate | .14 | 16.94 |
| Dimethylterephthalate | .28 | 37.80 |
| Terephthalic Acid | .20 | 23.08 |

| MATERIAL | EQUIVALENT RATIO | WEIGHT 100 GRAM YIELD |
|---|---|---|
| Benzoic Acid | .02 | 3.33 |
| Solvent Yellow 135 | — | 0.70 |

EXAMPLE 9

Procedure the same as example 6.

| MATERIAL | EQUIVALENT RATIO | WEIGHT 100 GRAM YIELD |
|---|---|---|
| Cyclohexanedimethanol (90%) | .36 | 42.11 |
| tris(2-hydroxyethyl)-Isocyanurate | .15 | 19.07 |
| Dimethylterephthalate | .49 | 69.48 |
| Zinc Acetate | — | 1.50 |
| Basic Red 1 | — | 0.64 |
| Basic Violet 11 | — | 0.96 |

EXAMPLE 10

Procedure the same as example 6.

| MATERIAL | EQUIVALENT RATIO | WEIGHT 100 GRAM YIELD |
|---|---|---|
| Propylene glycol | .20 | 13.64 |
| Neopentyl glycol | .30 | 28.00 |
| Dimethylterephthalate | .20 | 34.82 |
| Isophthalic Acid | .30 | 44.68 |
| Solvent Yellow 43 | — | 1.00 |

EXAMPLE 11

Procedure the same as example 2, except the material was heated to 235° C., zinc acetate was added, dye was added, held 15 minutes, and dumped.

| MATERIAL | EQUIVALENT RATIO | WEIGHT 100 GRAM YIELD |
|---|---|---|
| Cyclohexanedimethanol (90%) | .35 | 44.37 |
| Trimethylolpropane | .15 | 10.60 |
| Dimethylterephthalate | .49 | 75.27 |
| Zinc Acetate | — | 3.00 |
| Solvent Yellow 131 | — | 1.45 |
| Basic Red 1 | — | 0.20 |
| Basic Violet 11 | — | 0.32 |

EXAMPLE 12

Procedure the same as example 2, except the material was heated to 270° C., zinc acetate was added, temperature fell to 250° C., dye was added, held 15 minutes, and dumped.

| MATERIAL | EQUIVALENT RATIO | WEIGHT 100 GRAM YIELD |
|---|---|---|
| Cyclohexanedimethanol (90%) | .425 | 50.37 |
| Trimethylolpropane | .075 | 4.96 |
| Dimethylterephthalate | .490 | 70.41 |
| Zinc Acetate | — | 3.00 |
| Solvent Yellow 126 | — | 2.00 |
| Basic Red 1 | — | 0.425 |
| Basic Violet 11 | — | 0.10 |

EXAMPLE 13

The following material was was cold charged into the reaction flask, heated to 240° C., zinc acetate was added, dyed and dumped.

| MATERIAL | EQUIVALENT RATIO | WEIGHT 100 GRAM YIELD |
|---|---|---|
| Cyclohexanedimethanol (90%) | .54 | 59.61 |
| Cyclohexanedicarboxylic Acid | .15 | 17.77 |
| Terephthalic Acid | .31 | 35.48 |
| Solvent Yellow 126 | — | 1.50 |

EXAMPLE 14

Procedure the same as example 13, except material was heated to 270° C., zinc acetate was added, temperature fell to 250° C., dyed and dumped.

| MATERIAL | EQUIVALENT RATIO | WEIGHT 100 GRAM YIELD |
|---|---|---|
| Cyclohexanedimethanol (90%) | .540 | 59.42 |
| Cyclohexanedicarboxylic Acid | .075 | 8.95 |
| Terephthalic Acid | .385 | 43.92 |
| Zinc Acetate | — | 3.00 |
| Solvent Yellow 126 | — | 2.00 |
| Basic Red 1 | — | 0.40 |
| Basic Violet | — | 0.10 |

I claim:

1. A fluorescent pigment comprising:
   a. a fluorescent dye;
   b. a crystalline thermoplastic opaque polyester resin comprised of:
      i. from 55 to 80 equivalent % crystallinity producing monomers selected from the group consisting of:
         A) crystallinity producing dicarboxylic acid monomers selected from the group consisting of: linear aliphatic, para aromatic, or trans-1,4 cyclohexyl difunctional carboxylic acids and their corresponding esters or anhydrides and mixtures thereof; and crystallinity producing dihydroxy monomers selected from the group consisting of linear aliphatic, para aromatic, or trans-1,4-cyclohexyl difunctional hydroxy compounds and mixtures thereof; with the equivalent % ratio of A to B being from 1:2.5 to 2.5:1;
         B) a linear hydroxy aliphatic monocarboxylic acids, para-hydroxy aromatic carboxylic acids and trans 1-hydroxy, 4-cyclohexyl carboxylic acids and their corresponding ester derivatives; and,
         C) and mixtures thereof;
      ii. from about 20 to 45 equivalent % amorphous producing monomers selected from the group consisting of:
         branched or substituted aliphatic difunctional carboxylic acids and their corresponding esters and anhydrides;
         branched or substituted difunctional aliphatic hydroxy compounds;

ortho or meta substituted difunctional aromatic carboxylic acids, their corresponding esters and anhydrides;

ortho or meta substituted difunctional aromatic hydroxy compounds;

cis or trans 1,2 and 1,3 difunctional cyclohexyl carboxylic acids, their corresponding esters, anhydrides, and hydroxy compounds;

cis 1,4 cyclohexyl difunctional carboxylic acids, their corresponding esters and hydroxy compounds;

trifunctional aliphatic aromatic, or cyclical carboxylic acids and their corresponding esters and anhydrides;

trifunctional aliphatic, aromatic, and cyclical hydroxy compounds;

and mixtures thereof.

2. The fluorescent pigment of claim 1, wherein the crystallinity producing carboxylic acid monomers are selected from the group consisting of dimethylterephthalate, terephthalic acid and trans-1,4-cyclohexanedicarboxylic acid; and mixtures thereof and the crystallinity producing hydroxy containing monomer is trans-1,4-cyclohexanedimethanol.

3. The fluorescent pigment of claim 1, wherein the crystallinity producing carboxylic acid monomers are selected from the group consisting of dimethylterephthalate, terephthalic acid and trans-1,4-cyclohexanedicarboxylic acid and mixtures thereof; and the crystallinity producing hydroxy containing monomer is trans-1,4, cyclohexanedimethanol.

4. The fluorescent pigment of claim 1, wherein the crystallinity producing dicarboxylic acid monomer is dimethylterephthalate, the crystallinity producing dihydroxy containing monomers is trans-1,4-cyclohexane dimethanol, and the amorphous producing monomers are trimethylolpropane and cis-1,4-cyclohexanedimethanol.

5. The fluorescent pigment of claim 1, wherein the crystallinity producing dicarboxylic acid monomer is terephthalic acid, the crystallinity producing dihydroxy containing monomer is trans-1,4-cyclohexanedimethanol and the amorphous producing monomers are trimethylolpropane, isophthalic acid and cis-1,4-cyclohexanedimethanol.

6. The fluorescent pigment of claim 1, wherein the crystallinity producing dicarboxylic acid monomer is terephthalic acid, the crystallinity producing dihydroxy containing monomer is trans-1,4-cyclohexane dimethanol and the amorphous producing monomers are trimethylolpropane and cis-1,4-cyclohexanedimethanol.

7. The fluorescent pigment of claim 1, wherein the crystallinity producing dicarboxylic acid monomer is terephthalic acid, the crystallinity producing dihydroxy containing monomer is trans-1,4-cyclohexanedimethanol and the amorphous producing monomers are trimethylolpropane, isophthalic acid tris(2-hydroxyethyl)-isocyanurate, and cis-1,4-cyclohexanedimethanol.

8. The fluorescent pigment of claim 1, wherein the crystallinity producing dicarboxylic acid monomer is dimethylterephthalate, the crystallinity producing dihydroxy containing monomer is trans-1,4-cyclohexanedimethanol and the amorphous producing monomers are tris(2-hydroxyethyl)-isocyanurate and cis-1,4-cyclohexanedimethanol.

* * * * *